UNITED STATES PATENT OFFICE.

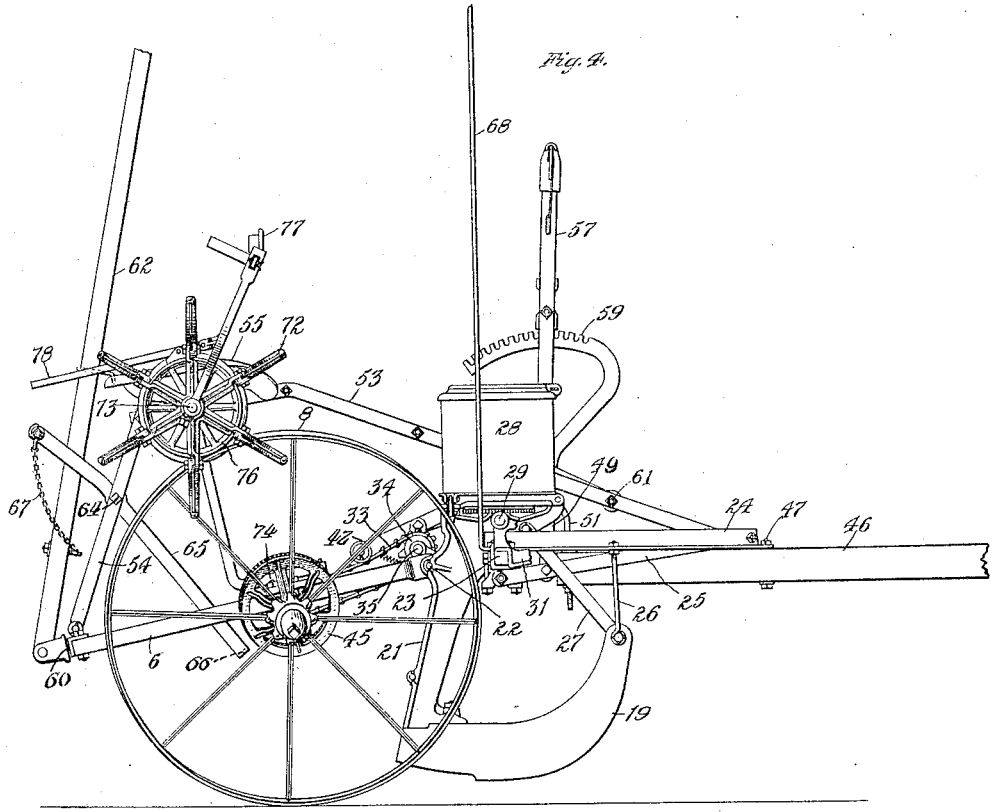

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CORN-PLANTER.

1,205,296.   Specification of Letters Patent.   Patented Nov. 21, 1916.

Application filed April 17, 1914. Serial No. 832,568.

*To all whom it may concern:*

Be it known that I, LEWIS E. WATERMAN, a citizen of the United States, residing at Rockford, in the county of Winnebago and State of Illinois, have invented certain new and useful Improvements in Corn-Planters, of which the following is a specification.

This invention relates in general to seed planters and has more particular reference to corn planters of the general type wherein the seed dropping mechanism is operated intermittently to drop the seeds in hills, the machine being also adapted to drop the seeds in succession, commonly referred to as drilling.

Planters of this general character as constructed prior to my present invention have had the seed delivery and furrow opening shoes mounted a considerable distance ahead of the supporting wheels upon which the planter is carried. The shoes are accordingly partially supported by the pole or tongue of the machine, and when the planter is traveling over rough or uneven ground the shoes are frequently lifted out of the ground, with the result that the seeds are deposited on top of the ground and are not covered by the soil. It will be obvious that the closer the shoes can be brought to the axle of the supporting wheels the less movement they will have with respect to the axle when traveling over uneven ground.

One of the primary objects of this invention, therefore, is to position the shoes as close to the supporting wheel axles as possible, so that they will deliver the seeds in close proximity to that portion of each supporting wheel which is in contact with the ground.

Another object of the invention is to so connect the main frame of the planter with the seed delivery means that the machine will be substantially balanced on the supporting wheels by the weight of the operator on the seat. This balancing renders the raising and lowering of the shoes very easy.

Another object of the invention is the provision of novel connections between the supporting wheel axles and the main frame whereby the wheels and each wheel section may be adjusted with respect to the frame into the required position.

A further object is to provide improved foot operative means for lifting the marker from operative position into a position where it may be grasped by the operator sitting on the seat.

Other objects and advantages of this invention will be manifest as the same is better understood by reference to the following description when considered in connection with the accompanying drawings.

Figure 1:
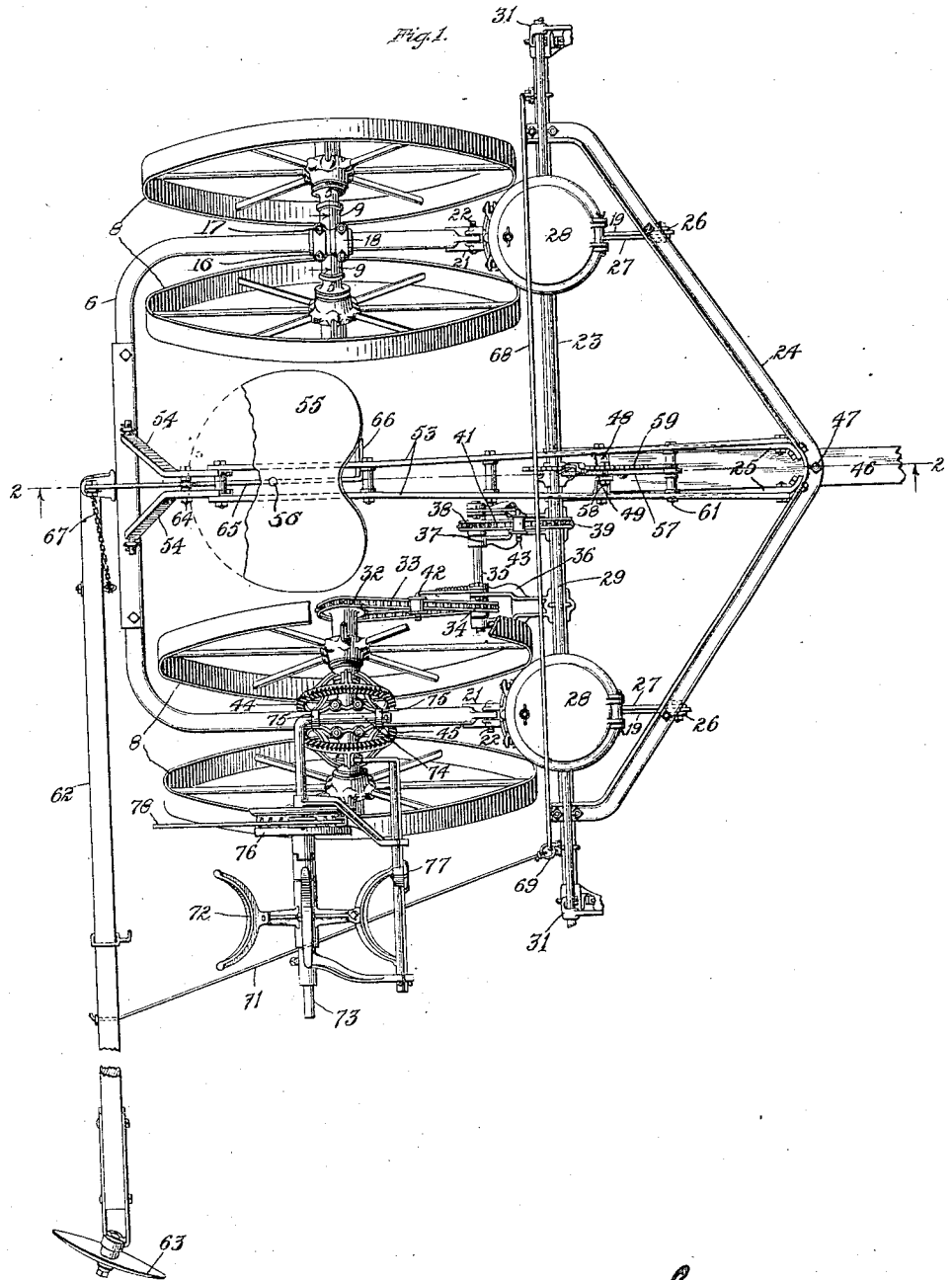
Figure 2:
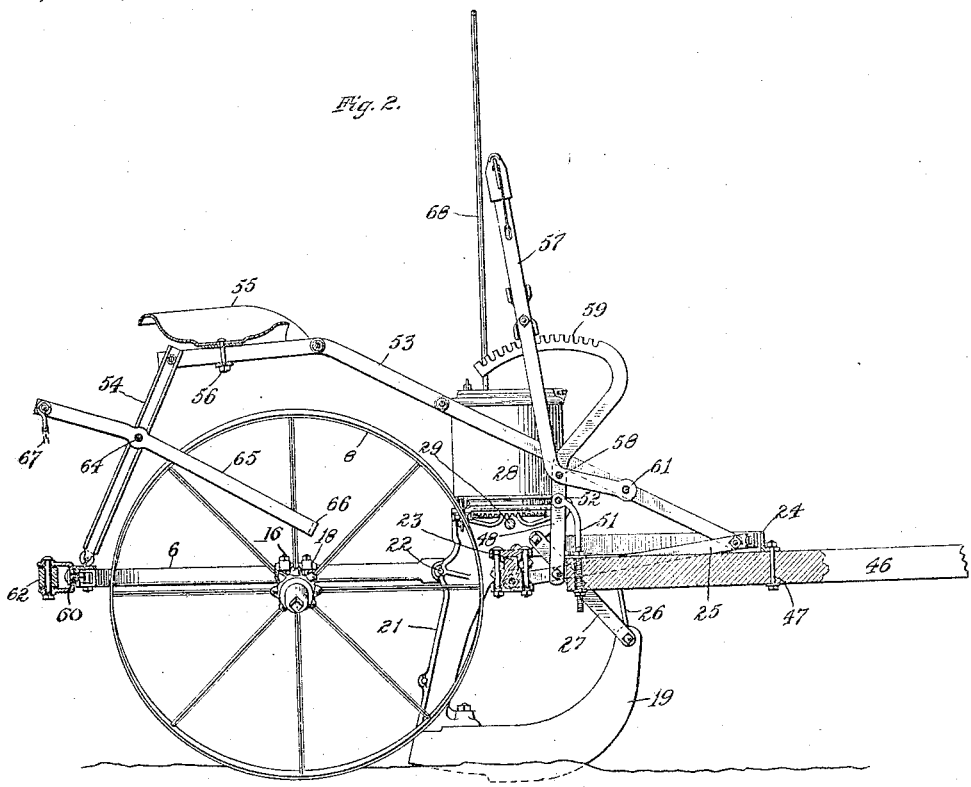
Figure 3:
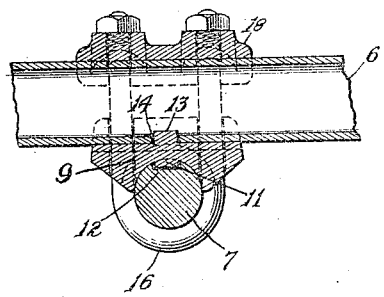

Referring to the drawings, Figure 1 is a plan view of the planter embodying my invention. Fig. 2 is a central longitudinal sectional view through the machine shown in Fig. 1. Fig. 3 is a fragmentary sectional view through one of the wheel axles, this view being taken substantially on the line 3—3 of Fig. 5. Fig. 4 is a side elevation of the machine shown in Fig. 1, and Fig. 5 is a detail view taken on the line 5—5 of Fig. 1.

In the drawings reference character 6 designates generally the main frame of the planter which is preferably of hollow construction as shown in Figs. 3 and 5, and is bent to substantially U shape as shown in Fig. 1. Each of the legs of the U shape frame is supported by a bent axle 7 upon which the twin wheels 8 are mounted, each wheel comprising, as shown in the drawings, a pair of sections spaced apart on the axle and having their lower portions disposed nearer together than their upper portions to pack the dirt at each side of the row being planted, without compressing and packing the dirt directly over the seeds.

The connections between the axle 7 and the main frame 6 are so constructed that the axles may be adjusted with respect to the frame to properly aline and position the supporting wheels relative to the point of seed delivery. This adjusted connection, which is most clearly illustrated in Figs. 3 and 5, includes a bearing member 9 disposed over the central portion of the axle and held against movement with respect to the axle by an integral lug 11 seated in a socket 12 formed in the top of the axle. The upper face of the member 9 is provided with a similar lug 13 engaged in an aperture 14 formed in the frame 6, and at the base of lug 13 the member 9 is inclined downwardly away from the lug to afford a rocking bearing for the frame 6 around the lug 13. Suitable guides 15 are formed on the member 9 in spaced relation to accommodate the frame 6 between them. The frame and the axle are clamped together and rigidly connected by a pair of U bolts 16 and 17 respectively, embracing the shaft and projecting upwardly through a plate 18 overlying the frame. When the nuts on the bolts are drawn down tightly, the frame is rigidly clamped to the axle and adjustment of the axle with respect to the frame may be effected by loosening or tightening the nuts on one or the other of the bolts so as to lock the shaft into the required position with respect to the frame thus disposing the wheels in the desired position.

A seed delivery device comprising a furrow opening shoe 19 and a rigidly attached boot or seed-chute 21 is pivotally connected with the front end of each of the legs of the main frame. It will be observed from Figs. 2 and 4 that the seed delivery devices are positioned rearwardly of the front edges of the wheels, and from Fig. 1 that the seed delivery devices are disposed between the sections of each wheel. This arrangement brings the speed delivery device as near the axles of the wheels as possible, and when the planter is in operation the seeds will be delivered through the chute 21 to the furrow in close proximity to that portion of each wheel which is in contact with the ground. This position of the seed delivery devices in proximity to the centers of the wheels reduces the amount of relative vertical movement between the shoes and the wheels when the machine is in operation to a minimum and thereby insures that all of the seeds will be deposited in a furrow and covered by the wheels.

The seed-chutes 21 are pivotally connected with the front ends of the frame by bolts or pins 22 and are fixedly bolted or otherwise secured to a front frame comprising a cross member 23 and a forwardly arched member 24 fixedly connected at its ends to the cross member. Braces 25 bolted at their forward ends to the arch member 24 and pivotally connected at their rear ends to the cross member 23 serve to strengthen and lend rigidity to the front frame. The forward ends of the shoe 19 are connected with the member 24 by vertically adjustable links 26, and with the upper ends of the seed-chutes by links 27, as best shown in Figs. 2 and 4. The seed boxes 28 are mounted above the seed-chutes 21, and the seed plates and other dropping mechanism (not shown) are operated from the single shaft 29 mounted in suitable bearings beneath the seed boxes and in brackets 31 at each end of the cross member 23. It will be observed that by adjusting the nuts on the upper ends of the links 26, the seed dropping mechanisms and shoes may be rocked on the cross member 23 whereby to adjust the point of seed discharge. The drive mechanism for this shaft which forms the subject matter of my companion application, Ser. No. 832,569, filed Apr. 17, 1914, and which will be described only in a general way in this application, comprises a sprocket wheel 32 fixed on the inner end of the hub of one of the supporting wheels and adapted to drive by means of a chain 33 a second sprocket wheel 34 fixed on a countershaft 35 carried in suitable brackets 36 and 37 projecting rearwardly from the cross member 23. A second sprocket wheel 38 fixed on the shaft 35 is adapted to drive an alined sprocket wheel 39 fixed on shaft 29 through the instrumentality of a chain 41. Suitable chain tighteners 42 and 43 are utilized to maintain the driving chains under the proper tension. In order that both sections of the drive wheel may be utilized for driving purposes, I have equipped the opposed hubs of each section with face gears 44 and 45 which, by reason of the shape of shaft 7, are maintained in mesh at their lower edges thereby connecting the two wheel sections together so that they will rotate in unison and will both be utilized for driving purposes. The check forks and the other operating mechanisms which are employed to intermittently actuate the shaft 29 are not shown on the present drawings, since these mechanisms including a clutch connection between the sprocket wheel 39 and the shaft 29 are fully disclosed in my companion application previously mentioned.

The pole or tongue 46 to which the horses are attached is bolted through the arch member 24 by a bolt 47 and is adjustably connected at its rear end with a pair of upstanding members 48 and 49 bolted at their lower ends to the braces 25. The connection between these members and the tongue being effected through a bolt 51 pivoted to the members on a bolt 52 and secured to the tongue by nuts threaded onto the bolt 51. A pair of seat supports 53 attached at their forward ends to the braces 25 extend upwardly and rearwardly over the center of the machine and are supported at their rear ends by a pair of links 54 bolted at their upper ends to the rear ends of the seat support and pivoted at their lower ends on the main frame of the planter. A seat 55 is carried by the supports 53 rearwardly of the supporting axles 7, so that the weight of the operator on the seat tends to counterbalance the weight of the seed boxes and other mechanism attached to the front end of the main frame. The seat is clamped on the supports 53 by a clamping bolt 56 which may be loosened to permit the adjustment of the seat forwardly or rearwardly in order that the seat may be properly positioned to substantially balance the main frame on the supporting wheels when the operator is in position on the seat.

For the purpose of raising and lowering the shoes and regulating the depth of the planting, I have pivoted an operating lever 57 upon a pin 58 carried by an upward extension of the member 48, this extension being continued and curved rearwardly to provide a notched segment 59 with which the ordinary manually controlled latch, carried by the lever 57, engages to hold the lever in adjusted position. The forwardly extending lower end of the lever 57 is connected by bolt 61 with the seat supporting members 53, this bolt serving as a fulcrum of the lever during the raising and lowering operations. Assuming that the parts are in the position shown in Fig. 2, if the operating lever is swung to the right about its fulcrum 61, the pivot point 58 may be lifted by the lever, thereby lifting all the mechanism at the front of the planter into the position shown in Fig. 4. The main frame 6 during the lifting movement being adapted to pivot on the supporting axles 7. It will be manifest that the driving connections between the drive wheel and the shaft 29 will not be disturbed by the raising and lowering operations for the reason that the countershaft 35 is mounted substantially in alinement with the pivotal connections 22 between the main frame and the front frame. Movement of the operating lever in the opposite direction will, of course, lower the shoes and other mechanism associated therewith into operative position as shown in Fig. 2.

It is believed that my invention and its operation will be fully understood from the foregoing without further description, and, while I have shown and described those structural features which at present it seems desirable to embody in my improved planter, it will be obvious that various modifications in the structural details shown and described may be resorted to within the scope of the appended claims, and without departing from the spirit, or sacrificing any of the material advantages of the invention.

I claim as my invention:

1. In a planter, the combination of a frame, a supporting-axle, wheel sections mounted thereon in spaced relation, a bearing member interposed between said frame and axle and having a lug engaged with said frame intermediate the spaced wheels, and and means for so adjustably clamping said axle to the frame that by adjustment of said means the axle may be rocked on the frame-engaging lug as a fulcrum to move in unison the portion of each wheel section in contact with the ground laterally with respect to the frame.

2. In a planter, the combination of a frame, an axle mounted thereon, a pair of carrying-wheels mounted in spaced relation on the axle, seed delivery means the discharge end of which is located forward of and intermediate that portion of each wheel in contact with the ground, and means for adjustably rocking said axle on the frame on a substantially horizontal axis disposed intermediate said wheels and extending transversely of the axle, whereby to laterally adjust the tread of the wheels with respect to the said discharge end of the delivery means.

3. In a planter, the combination of a frame, an axle, a pair of supporting wheels mounted in spaced relation on the axle, means connecting the axle intermediate said wheels to the frame and including a pair of bolts spaced apart longitudinally of the axle, and means whereby upon adjustment of said bolts the axle will be rocked on a fulcrum intermediate said bolts to move in unison said wheels to laterally adjust the tread thereof.

4. In a planter, the combination with a frame, a pair of axles mounted thereon, a pair of supporting wheels mounted in spaced relation on each axle, a pair of seed delivery devices mounted on the frame and each having its seed discharge end located intermediate a pair of wheels, and means for adjusting each axle on a fore and aft fulcrum disposed intermediate its wheels so that the axle may be rocked to move in unison the tread of its wheels laterally with respect to the discharge end adjacent said seed delivery means.

5. In a planter, the combination of a frame, a pair of axles having their ends turned downwardly, a wheel mounted on each downturned end of each axle, the axles being each mounted on the frame to rock on a fore and aft fulcrum intermediate the downturned axle ends whereby to adjust the tread of the wheels on each axle laterally in unison by adjusting the axle on said fulcrum.

6. In a planter, the combination of a frame, a pair of twin wheels, means adjustably securing the twin wheels to the frame including a bearing intermediate the wheels of each pair providing a fore and aft fulcrum upon which the said wheels of each pair may be rocked as a unit to adjust the tread laterally with respect to the frame.

7. The combination of a frame, an axle having a pair of wheels mounted thereon in spaced relation, means securing the axle to the frame comprising a two-part support one part of which is formed with a recess and the other shaped to fit in said recess, a transverse bearing between the respective parts, and adjustable fastening devices on each side of the said transverse bearing whereby the axle may be rocked on said bearing relatively to the frame and held in fixed relation thereto.

8. The combination of a frame element, an axle having a pair of wheels mounted thereon in spaced relation, a bearing member mounted on the axle intermediate the wheels and provided with a lug located in a recess in the axle to hold the bearing member against lengthwise movement with respect to the axle, a transverse fulcrum between the said bearing member and frame element, and adjustable fastening devices on opposite sides of said transverse fulcrum holding the axle in fixed relation to the frame element and permitting adjustment of the axle on said transverse fulcrum whereby to adjust the wheels as a unit relatively to the frame.

LEWIS E. WATERMAN.

Witnesses:
R. A. HEMINWAY,
A. C. DENISON.